United States Patent
Sato et al.

(10) Patent No.: US 8,542,867 B2
(45) Date of Patent: Sep. 24, 2013

(54) IMAGE PROCESSING FOR REPRODUCING CODE IMAGE FROM ORIGINAL INFORMATION

(75) Inventors: Yuushi Sato, Kawasaki (JP); Yasuhiro Kozuka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1224 days.

(21) Appl. No.: 12/181,049

(22) Filed: Jul. 28, 2008

(65) Prior Publication Data

US 2009/0034787 A1 Feb. 5, 2009

(30) Foreign Application Priority Data

Jul. 31, 2007 (JP) .................................. 2007-198948
Dec. 25, 2007 (JP) .................................. 2007-331884

(51) Int. Cl.
*G06K 9/00* (2006.01)
*G06K 5/00* (2006.01)
*G06K 7/10* (2006.01)
*H04L 23/00* (2006.01)

(52) U.S. Cl.
USPC ............ 382/100; 235/437; 235/462; 375/400

(58) Field of Classification Search
USPC .................. 235/462, 437; 375/240; 382/100
See application file for complete search history.

(56) References Cited

U.S. PATENT DOCUMENTS

| 5,631,457 | A | * | 5/1997 | Fukuda et al. .............. 235/462.1 |
| 5,726,435 | A | | 3/1998 | Hara et al. ...................... 235/294 |
| 6,002,794 | A | * | 12/1999 | Bonneau et al. .............. 382/166 |
| 6,798,917 | B2 | | 9/2004 | Fujiwara et al. .............. 382/240 |
| 7,431,214 | B2 | * | 10/2008 | Iwaguchi et al. ......... 235/462.08 |
| 2007/0103722 | A1 | | 5/2007 | Sato ............................ 358/1.15 |
| 2010/0040153 | A1 | * | 2/2010 | Imanaka et al. ......... 375/240.27 |

FOREIGN PATENT DOCUMENTS

JP 7-254037 A 10/1995

* cited by examiner

*Primary Examiner* — Twyler Haskins
*Assistant Examiner* — Justin Katzwhite
(74) *Attorney, Agent, or Firm* — Fitzpatrick, Cella, Harper & Scinto (57) ABSTRACT

An image processing apparatus and method determine whether an error detecting rate of original information extracted from a code image in a read image obtained by reading a sheet on which the code image is formed, is not smaller than a predetermined value. When it is not smaller than a predetermined value, a code image is reproduced from the extracted original information and the code image in the read image is replaced therewith. One example of the code image is a barcode.

7 Claims, 9 Drawing Sheets

DOCUMENT IMAGE BEFORE
CODE IMAGE IS REMOVED

IMAGE AFTER CODE
IMAGE IS REMOVED (S507)

PORTION AT WHICH
CONTENT IS NOT
OVERLAID CAN
BE REMOVED

CODED IMAGE CANNOT
BE REMOVED AT
PORTION AT WHICH
CONTENT IS OVERLAID

FIG.6

IMAGE AFTER CODE
IMAGE IS REMOVED

IMAGE IN WHICH
CODE IMAGE IS
REPRODUCED AT
S508, S509

IMAGE PROCESSING FOR REPRODUCING CODE IMAGE FROM ORIGINAL INFORMATION

BACKGROUND OF THE INVENTION

1. Field of the Invention

The present invention relates to image processing and, more particularly, to image processing for reproducing a code image, such as a two-dimensional barcode image, from original information.

2. Description of the Related Art

The number of occasions is increasing, where a code image (digital watermarking image, two-dimensional barcode image, barcode image, steganography, etc.) is combined with a document image for printing using a multifunction printer (MFP).

The MFP creates a code image by adding an error correcting code to original information to obtain code-added information and constructing an image from the code-added information, so that the original information can be extracted later from the code image without fail. In the present specification, adding an error correcting code is referred to as error correction coding. Further, "adding an error correcting code to obtain code-added information and constructing an image from the code-added information" is referred to as code image construction.

As described above, by adding an error correcting code to original information, it is possible to extract the original information from a damaged code image in printed matter even if the code image in the printed matter has been damaged (for example, stained).

Here, the Reed-Solomon code will be described as an example of an error correcting code used for two-dimensional codes.

In the Reed-Solomon code, an error correcting rate is obtained by (½)×(amount of original information)/(amount of original information+amount of error correcting code). With this arrangement, in the Reed-Solomon code, for example, when the amount of original information is the same as the amount of error correcting code, the error correcting rate is 25%.

An error correcting rate of 25% means that it is possible to accurately extract the original information even if 25% of the two-dimensional code has been damaged. However, the size of the two-dimensional code with an error correcting rate of 25% is double that of the two-dimensional code with an error correcting rate of 0% (coded image constructed from original information without the addition of the error correcting code to the original information).

That is, on one hand, there is an advantage that, when the error correcting rate is high, the original information can be obtained correctly even if the two-dimensional code is damaged. On the other hand, there is however a disadvantage that the two-dimensional code becomes large in size. At a result, the ratio of the amount of error correcting code to the amount of original information is usually determined in consideration of the balance between them.

Japanese Patent Laid-Open No. 7-254037 (1995) discloses a method for producing a two-dimensional barcode.

Conventionally, there has been a problem that the two-dimensional code is damaged more than the error correcting rate in copying a code image with a high error correcting rate (two-dimensional barcode image). If the two-dimensional code is damaged more than the error correcting rate, error correction is no longer available and therefore it is no longer possible to extract the original information of the code image. For example, this problem arises in a second-generation copy after first generation copying is repeated.

The situation in which the extraction of original information from a code image is no longer available is referred to as the occurrence of extraction error in this specification. The "error detecting rate" indicates the ratio of the area of the damaged code image to the total area of the code image. This ratio refers to a ratio of the amount of information that requires error correction by an error correcting code to the amount of original information.

SUMMARY OF THE INVENTION

The present invention has been developed in consideration of the above problems and provides image processing capable of preventing the convenience of users from being sacrificed by reproducing a code image from original information even if a code image, such as a two-dimensional barcode image, is damaged and the error detecting rate is reduced.

An aspect of the present invention is an image processing device electrically connected with a device that forms a code image on a sheet, wherein the code image is formed by constructing an image from original information subjected to error correction coding. The device comprises: an extraction unit configured to extract the original information from a code image in a read image obtained by reading a sheet on which the code image is formed; a determination unit configured to determine whether the error detecting rate of the extracted original information detected when the extraction unit extracts the original information is not smaller than a predetermined value; and replacement unit configured to, when the determination unit determines that the error detecting rate is not smaller than the predetermined value, reproduce a code image from the original information extracted by the extraction unit to replace the code image in the read image with the reproduced code image.

Another aspect of the present invention is a method for controlling an image processing device electrically connected with a device that forms a code image on a sheet, wherein the code image is formed by constructing an image from original information subjected to error correction coding, and wherein the method comprises the steps of: extracting the original information from a code image in a read image obtained by reading a sheet on which the code image is formed; determining whether an error detecting rate of the extracted original information detected when the original information is extracted at the extracting step is not smaller than a predetermined value; and reproducing a code image, when it is determined at the determining step that the error detecting rate is not smaller than the predetermined value, from the original information extracted at the extracting step to replace the code image in the read image with the reproduced code image.

Another aspect of the present invention is a program stored in a computer-readable medium for causing a computer to perform the steps in the above method.

Another aspect of the present invention is an image processing device electrically connected with a device that forms a code image on a sheet, wherein the code image is formed by constructing an image from original information subjected to error correction coding, and wherein the device comprises: an extraction unit configured to extract the original information from a code image in a read image obtained by reading a sheet on which the code image is formed; a determination unit configured to determine a code image missed portion in the read image by comparing the original information extracted by the extraction unit with the read image; and a replacement unit configured to reproduce a code image from the original information extracted by the extraction unit to replace the code image in the read image with the reproduced code image for the code image missed portion.

Another aspect of the present invention is a method for controlling an image processing device electrically connected with a device that forms a code image on a sheet, wherein the code image is formed by constructing an image from original information subjected to error correction coding, and wherein the method comprises the steps of: extracting the original information from a code image in a read image obtained by reading a sheet on which the code image is formed; determining a code image missed portion in the read image by comparing the original information extracted at the extracting step with the read image; and reproducing a code image from the original information extracted at the extracting step to replace the code image in the read image with the reproduced code image for the code image missed portion.

According to each aspect of the present invention, there is an advantage that the convenience of users is not sacrificed even when the two-dimensional barcode is damaged and the error detecting rate is reduced.

Further features of the present invention will become apparent from the following description of exemplary embodiments (with reference to the attached drawings).

DESCRIPTION OF THE EMBODIMENTS

Prior to the description of each embodiment, terms used in the present embodiments will be described.

Adding an error correcting code to original information is referred to as error correction coding of original information.

When an error correcting code is added to original information, code-added information is obtained as a result. Then, by constructing an image from the code-added information, a code image, such as barcode (including two-dimensional barcode), digital watermarking, steganography, etc., is obtained.

The error correction coding and the image construction are together referred to as code image construction. That is, a code image is constructed from original information, and a code image including an error correcting code is obtained as a result.

Converting a code image into information consisting of zeros and ones is referred to as computerization of a code image. Normally (when a code image is not damaged), the information obtained by computerization of a code image is the same as the code-added information as a result.

In addition, obtaining the original information from the information obtained by the computerization is expressed as retrieving the original information from the information obtained by the computerization.

That is, in order to obtain the original information from a code image, the computerization and the retrieval are carried out, and both are expressed together as extraction.

First Embodiment

Figure 1:
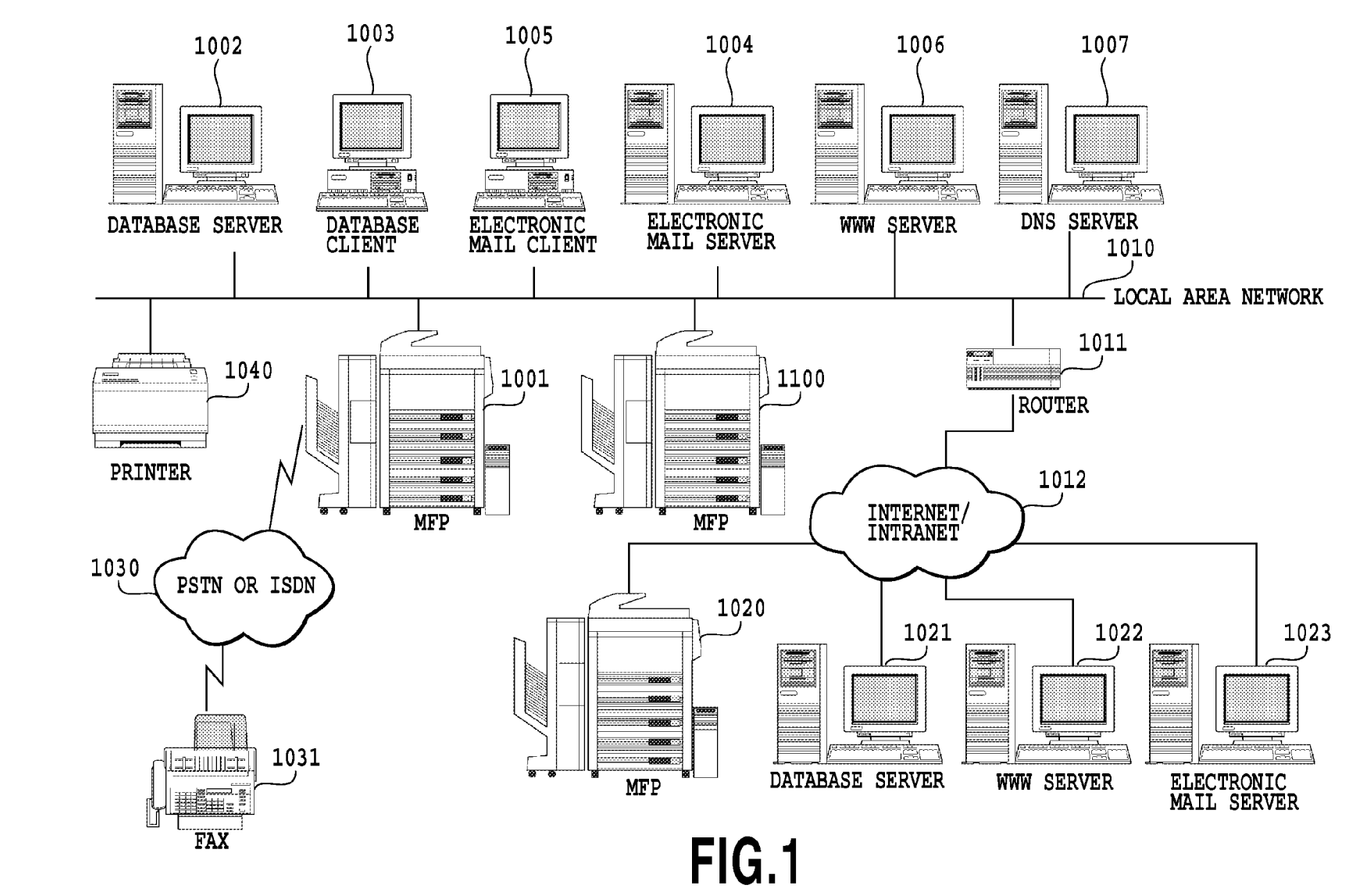
FIG. 1 is a configuration diagram of an entire network system according to a first embodiment of the present invention.

A configuration diagram of an entire network system according to the present embodiment is shown in FIG. 1. An MFP 1001 according to the present embodiment comprises a scanner and a printer. The MFP 1001 is capable of sending an image read using the scanner to a LAN 1010 or of printing out the image (forming the image on a sheet) received from the LAN 1010 using the printer. That is, the MFP 1001 performs an image reading function and also performs an image forming function and can operate as a printer.

The MFP 1001 also performs a FAX transmitting function and can transmit an image read using the scanner to PSTN or ISDN 1030 using the FAX transmitting function, and can print out the image received from the PSTN or the ISDN 1030 using the printer.

A database server 1002 manages a binary image and a multiple value image read by the MFP 1001 as a database. A client 1003, which is a database client of the database server 1002, can browse, retrieve, etc., images stored in the database 1002. An electronic mail server 1004 can receive an image read by the MFP 1001 as an attachment of an electronic mail. A client 1005, which is a client of the electronic mail server 1004 can receive mail to browse the mail received by the electronic mail server 1004 and transmit electronic mail.

A WWW server 1006 provides an HTML document to the LAN 1010 and the MFP 1001 can print out the HTML document provided from the WWW server 1006. Reference numeral 1007 denotes a DNS server. A router 1011 connects the LAN 1010 to the Internet/an intranet 1012. To the Internet/the intranet 1012, devices 1021, 1022, 1023, and 1020 similar to the above-described database server 1002, the WWW server 1006, the electronic mail server 1004, and the MFP 1001, respectively, are connected. On the other hand, the MFP 1001 can communicate with a FAX device 1031 via the PSTN or the ISDN 1030. Further, a printer 1040 is also connected onto the LAN 1010 and configured so that it can print out an image read by the MFP 1001.

Figure 2:
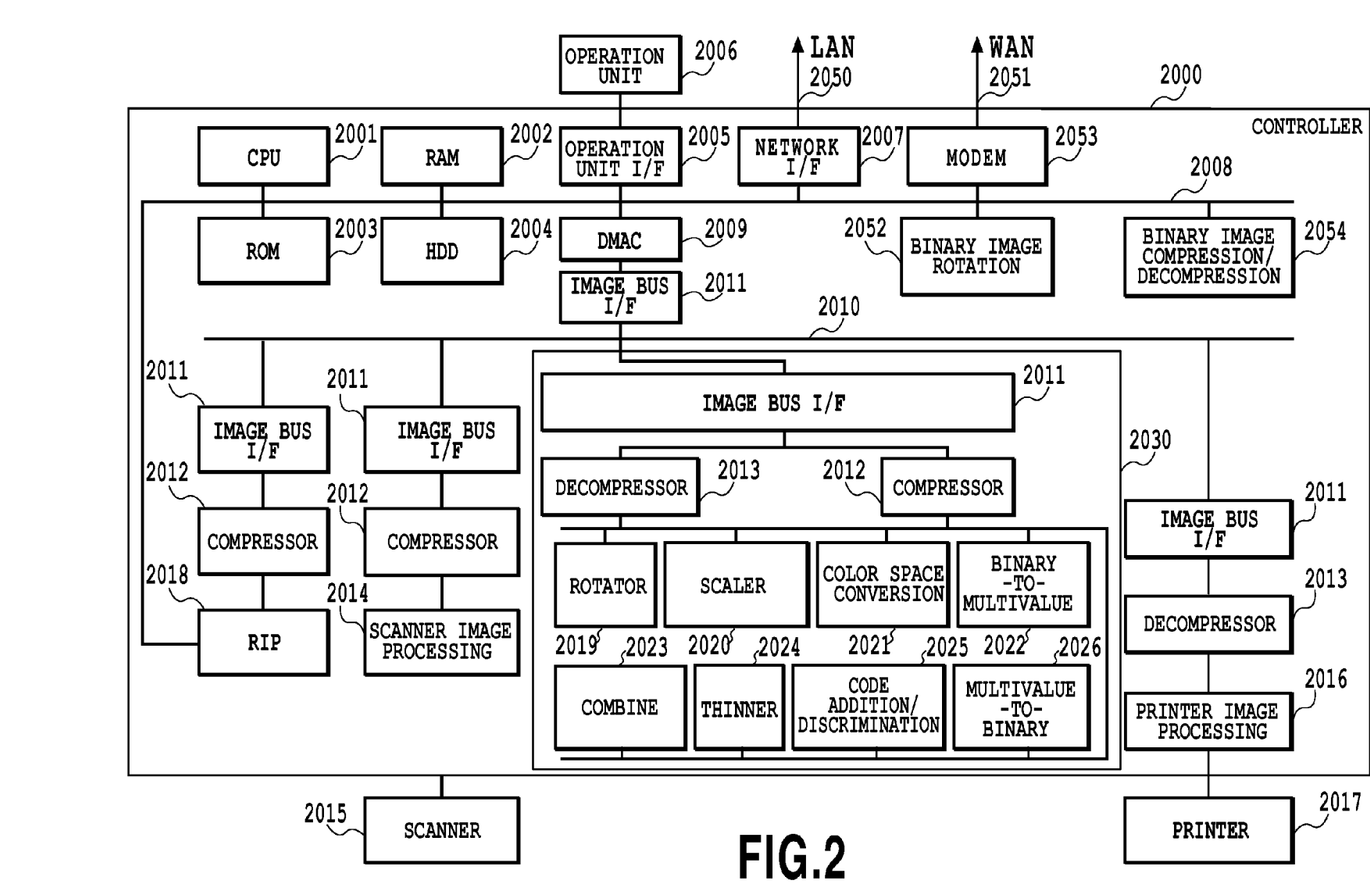
FIG. 2 is a block diagram for illustrating a configuration of a multifunction system according to the first embodiment of the present invention.

FIG. 2 is a block diagram for illustrating a configuration of a multifunction system (MFP 1001 or 1020) according to the present embodiment.

The multifunction system according to the present embodiment comprises a controller unit 2000, an operation unit 2006, a scanner 2015, and a printer 2017. The operation unit 2006 has an input operation unit including a keyboard for inputting predetermined commands or data and various switches and a display unit for displaying various displays including an input/set state of the MFP.

The controller unit 2000 is connected with the color scanner 2015, which is an image input device, and the color printer 2017, which is an image output device. On the other hand, the controller unit 2000 inputs/outputs image information and device information by connecting with a LAN 2050 or a public line (WAN) 2051. The scanner 2015 is configured so that it can read a document using two kinds of light sources and one of the light sources differs from the other in wavelength or illuminance.

A CPU 2001, which is a controller that controls the entire system, executes processing operations, such as various arithmetic operations, controls, discriminations, etc. A RAM 2002 is a system work memory with which the CPU 2001 operates and also an image memory for temporarily storing image data. In a ROM 2003, which is a boot ROM, a boot program of the system is stored. An HDD 2004, which is a hard disc drive, stores system software and image data.

An operation unit I/F 2005 is an interface unit that interfaces with the operation unit (UI) 2006 and outputs image data to be displayed on the operation unit 2006 to the operation unit 2006. The operation unit I/F 2005 also plays a role in transmitting information input by an operator of the system through the operation unit 2006 to the CPU 2001. A Network 2007 connects with the LAN 2050 and inputs/outputs information. A Modem 2053 connects with the public line 2051 and inputs/outputs image information.

A binary image rotation 2052 changes the orientation of an image before the Modem 2053 transmits a binary image and a binary image compression/decompression 2054 converts the binary image into a predetermined resolution or a resolution adapted to the performance of its communication party. The compression/decompression supports JBIG, MMR, MR, and MH. A DMA controller (DMAC) 2009 reads an image stored in the RAM 2002 without the intervention of the CPU 2001 and transmits the image to an ImageBus I/F 2011. The DMCA 2009 can write an image from an image bus 2010 to the RAM 2002 without the intervention of the CPU 2001.

The above devices are connected to a system bus 2008. The ImageBus interface (I/F) 2011 controls the input/output of an image at high speed via the image bus 2010.

A compressor 2012 JPEG-compresses an image in units of 32 pixels×32 pixels before the image is sent out to the image bus 2010. A decompressor 2013 decompresses the image sent out via the image bus 2010.

A raster image processor (RIP) 2018 receives a PDL code from a host computer via the Network 2007. Via the system bus 2008, the CPU 2001 stores the PDL in the RAM 2002. The CPU 2001 converts the PDL into an intermediate code and inputs it to the RIP 2018 again via the system bus 2008 and develops it into a bit-map image (multiple value).

A scanner image processing unit 2014 carries out various kinds of proper image processing (for example, correction, modification, edition) for a color image and a white-and-black image from the scanner 2015 and outputs them (multi-value). Similarly, a printer image processing unit 2016 carries out various kinds of proper image processing (for example, correction, modification, edition) for the printer 2017 and outputs them. At the time of printing, the decompressor 2013 carries out binary conversion, and therefore, binary and multiple value output are possible.

An image conversion unit 2030 has various image conversion functions converting an image on the RAM 2002 and is used when the image is drawn back in the RAM 2002 again.

A rotator 2019 can rotate an image in units of 32 pixels×32 pixels by a specified angle, corresponding to the binary and multiple value input/output. A scalar unit 2020 has a function of changing the resolution of an image (for example, from 600 dpi to 200 dpi) or scaling the image (for example, from 25% up to 400%). Before scaling, an image of 32 pixels×32 pixels is rearranged into an image in units of 32 lines.

A color space conversion unit 2021 converts a multiple value input image, for example, a YUV image in the memory into a Lab image by a matrix operation and an LUT and stores it in the memory. The color space conversion unit also performs a matrix operation of 3×8 and has a one-dimensional LUT, and can carry out publicly known backing elimination and show-through prevention. The converted image is output as a multi-value image. A binary-to-multiple-value conversion unit 2022 converts a binary image of 1 bit into a multiple value image of 8 bits and 256 gradations. Conversely, a multiple-value-to-binary conversion unit 2026 converts, for example, an image of 8 bits and 256 gradations in the memory into an image of 1 bit and two gradations using a technique, such as error diffusion processing, and stores it in the memory.

A combination unit 2023 has a function of combining two multiple value images (or binary images) in the memory into a single multiple value image (or binary image). For example, by combining an image of a company logo in the memory and a document image, the company logo can be simply attached to the document image. As a combination technique, publicly known techniques can be used, such as averaging for each pixel, taking a value of a pixel brighter in the brightness level as a value of the pixel after the combination, taking a darker pixel as a pixel after the combination, etc. Further, as the above-described combination technique, publicly known techniques can be also used, such as the execution of the logical OR operation, the logical AND operation, or the exclusive OR operation for each bit. A thinner unit 2024 is a unit that changes resolutions by thinning pixels of a multiple value image and can output a multiple value image of ½, ¼, or ⅛. By using this unit together with the scalar unit 2020, enlargement/reduction in a wider range can be carried out.

A code addition/discrimination unit 2025 combines a desired code image with a received image. The code addition/discrimination unit 2025 can extract original information from the code image in the received image. Specifically, the code image in the received image is computerized into information of zeros and ones, and then the original information is recovered from the information consisting of 0, 1.

Figure 3:
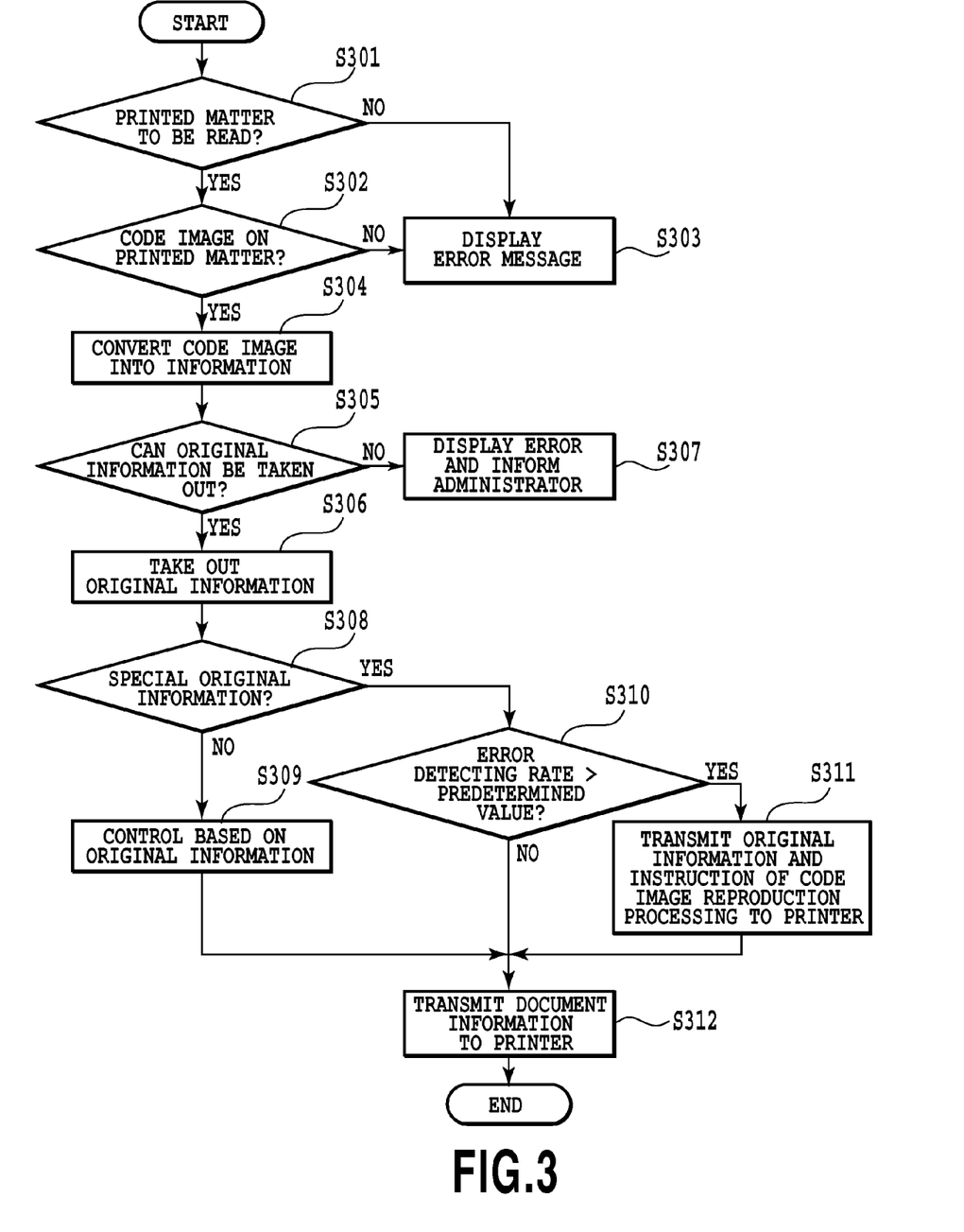
FIG. 3 is a flowchart showing processing relating to information obtained by error correction coding of an information source in the multifunction system according to the first embodiment of the present invention.

Next, the present embodiment will be described using a flowchart shown in FIG. 3.

Here, the MFP 1001 adds an error correcting code to original information to obtain code-added information and creates a code image by constructing an image from the obtained code-added information. That is, the MFP 1001 creates a code image by constructing a code image from the original information. Further, the MFP 1001 produces a combined image by combining the created code image with a read image and forms the produced combined image on a sheet.

In the present embodiment, it is assumed that there are cases where original information includes an ID of an image forming device (MFP or printer) for printing out a code image, a user ID, the date of output, the security level, and various pieces of information for preventing tampering. The original information including such various pieces of information is referred to as special original information.

The flow of processing when the MFP 1001 combines a code image with a read image for printing will be described.

The MFP 1001 receives special original information and a read image from a host computer connected to the MFP 1001.

Next, the MFP 1001 reads an error correcting rate stored in the HDD within the MFP 1001. Based on the read error correcting rate, the MFP 1001 adds an error correcting code to the special original information to obtain code-added information. Then, the MFP 1001 produces a code image by constructing an image from the code-added information.

The MFP 1001 obtains a combined image by combining a document image received from the host computer and the produced code image.

The MFP 1001 prints out and outputs the above-mentioned combined image on a sheet.

Subsequently, the processing when an MFP 1100 scans a printed matter will be described using FIG. 3.

It is assumed that a user has selected a code image read mode by means of the operation unit 2006 of the MFP 1100 prior to the scanning of the printed matter. The code image read mode is used when a user desires to read printed matter on which a code image is printed by a scanner, such as an MFP.

At step S301, the MFP 1100 determines whether or not there is a printed matter to be read on the document table of the scanner. This determination can be made based on a detection signal detected by a sensor provided on the document table of the scanner. When it is determined that there is a printed matter on the document table, the MFP 1100 scans (reads optically) the printed matter on the document table to produce a read image and then enters step S302. On the other hand, when it is determined that there is no printed matter on the document table, the MFP 1100 enters step S303 and displays an error message on a display screen.

At step S302, the MFP 1100 determines whether or not there exists a code image in the read image. When it is determined that there is a code image, the MFP 1100 enters step S304. On the other hand, when it is determined that there is no code image, the MFP also enters step S303 and displays an error message on the display screen.

At step S304, the MFP 1100 obtains information by computerizing the code image.

At step S305, the MFP 1100 determines whether or not the original information can be retrieved from the information obtained at step S304 using the error correcting code included in the information obtained at step S304. At this time, the error correcting rate of the original information is calculated.

In the present embodiment, the term "error detecting rate" refers to a ratio of the area of the damaged code image to the entire code image. This ratio is a ratio of the amount of information that requires error correction by the error correcting code to the amount of original information.

For example, when the error detecting rate is 4%, the ratio of the area of the damaged code image to the area of the entire code image is 4%.

When the original information is extracted from a code image having an error correcting rate of 7%, if the error detecting rate is 7%, the original information can be extracted from the code image somehow. However, when the original information is extracted from a code image having an error correcting rate of 7%, if the error detecting rate exceeds 7%, the exact original information cannot be extracted from the code image and a read error occurs as a result. It is assumed that in each image forming device described in the present embodiment, a code image is created with an error correcting rate of 7%.

At step S305, when it is determined that the original information can be retrieved, the MFP 1100 enters step S306 and then enters step S308 after retrieving the original information from the information obtained at step S304. On the other hand, when it is determined that the original information cannot be retrieved at step S305, the MFP 1100 enters step S307 and informs an administrator as well as displaying a read error on the display screen. In the present embodiment, informing an administrator means transmitting mail indicative of an abnormal original-information-retrieval state to an address registered as an address used by an administrator who administers the image forming device having received the error detecting rate.

At step S308, the MFP 1100 determines whether or not the original information obtained in S306 is the special original information. That is, it is determined whether or not the extracted original information includes the ID of the image forming device (MPF or printer) that prints out the code image, the user ID, the date of output (date of print), the security level, information for preventing tampering, etc. When the result of the determination is negative, that is, such information is not included, the MFP 1100 enters step S309 and controls the controller unit 2000 based on the original information. On the other hand, when such information is included, the MFP 1100 enters step S310.

At step S310, the MFP 1100 determines whether the error detecting rate calculated at step S305 is less than a predetermined value or not less than the predetermined value and when less than the predetermined value, the MFP 1100 enters step S312.

On the other hand, when the error detecting rate is not less than the predetermined value, the MFP 1100 enters step S311. The predetermined value is assumed to be 5% in the present embodiment.

Here, a method for deciding the predetermined value will be described using FIG. 4.

Figure 4:
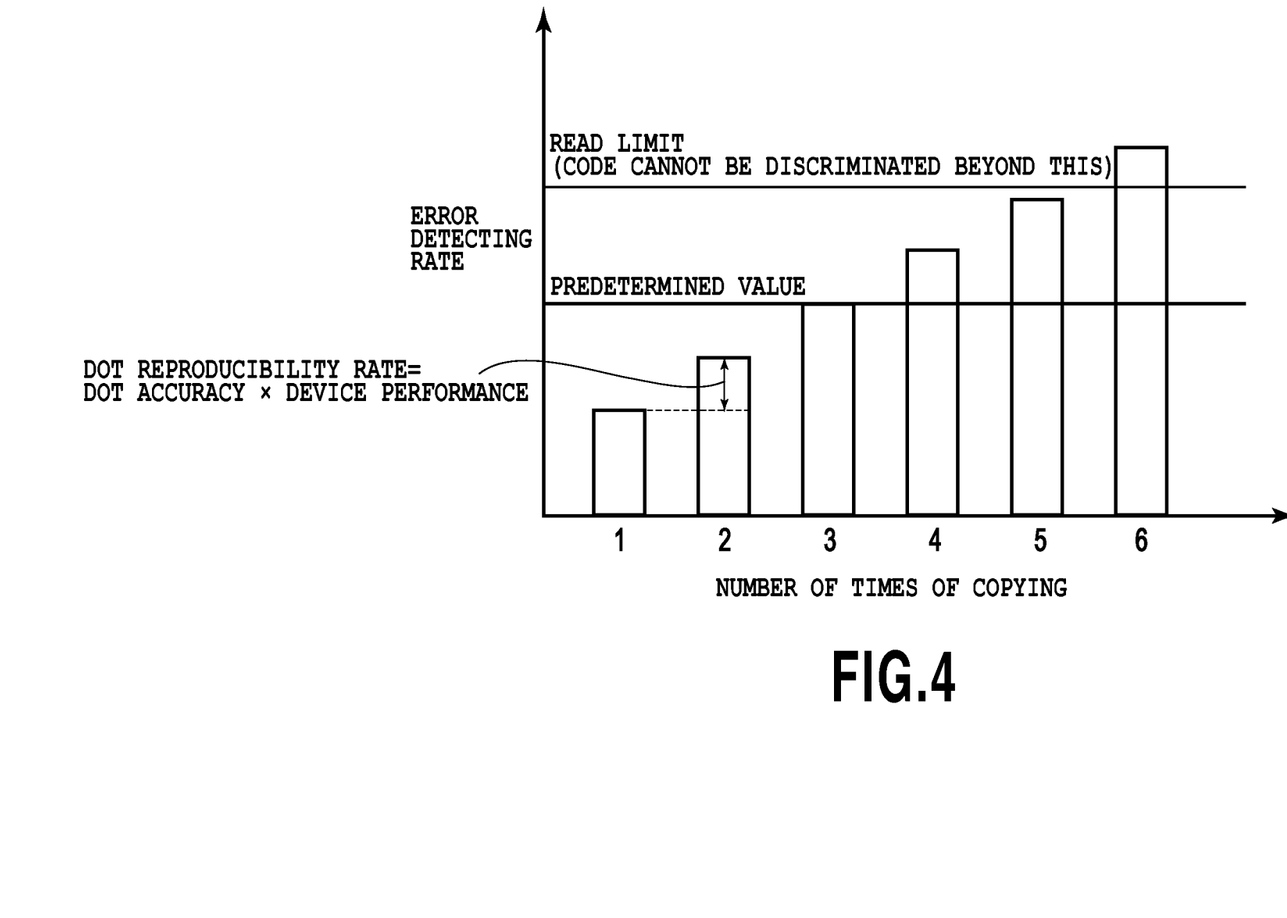
FIG. 4 is a diagram showing a relationship between the number of times of copying and the error rate according to the first embodiment of the present invention.

FIG. 4 is a diagram showing the relationship between the number of times of copying of a printed matter including a code image and the error detecting rate calculated by the MFP 1100 that has scanned the printed matter. In FIG. 4, the horizontal axis denotes the number of times of generation copying of the printed matter including the code image has been performed. The vertical axis denotes the error detecting rate calculated by the MFP 1100 that has scanned the printed matter.

The relationship between the error detecting rate and the number of times of generation copying is not always the same, but depends on the stains, etc., on the code image on the printed matter and other factors. However, FIG. 4 shows the relationship between the number of times of generation copying and the error detecting rate when it is assumed that no other factors than generation copying exist.

As described above, the reason that the MFP 1100 enters step S312 when the error detecting rate is less than the predetermined value at step S310 is that the degree of damage to the code image is very slight and it is not necessary to perform correction or the like of the code image. In addition, if the processing in S311 is carried out when it is not necessary to perform correction or the like of the code image, as described above, the time required for the processing is wasted, and therefore, in the present embodiment, the MFP 1100 enters step 312. If the processing at step S311 is carried out, two code images exist on a sheet as a result. If so, it becomes necessary to select one of the code images at the time of subsequent information extraction and excessive time is required for information extraction. To avoid this, the MFP 1100 enters step S312 in the present embodiment when it is not necessary to perform correction or the like of the code image as described above.

The reason that the MFP 1100 enters step S311 when the error detecting rate is not less than the predetermined value at step S310 is that the degree of damage to the code image is significant, and therefore, there may be a case where the original information cannot be retrieved when the code image after being printed is read again. At step S311, the MFP 1100 transmits the original information obtained in S306 and the instruction of code image reproduction processing to the image forming device (MFP 1001).

At step S312, the MFP 1100 transmits the read image to the image forming device (MFP 1001) indicated in the ID of the image forming device in the special original information.

Figure 5:
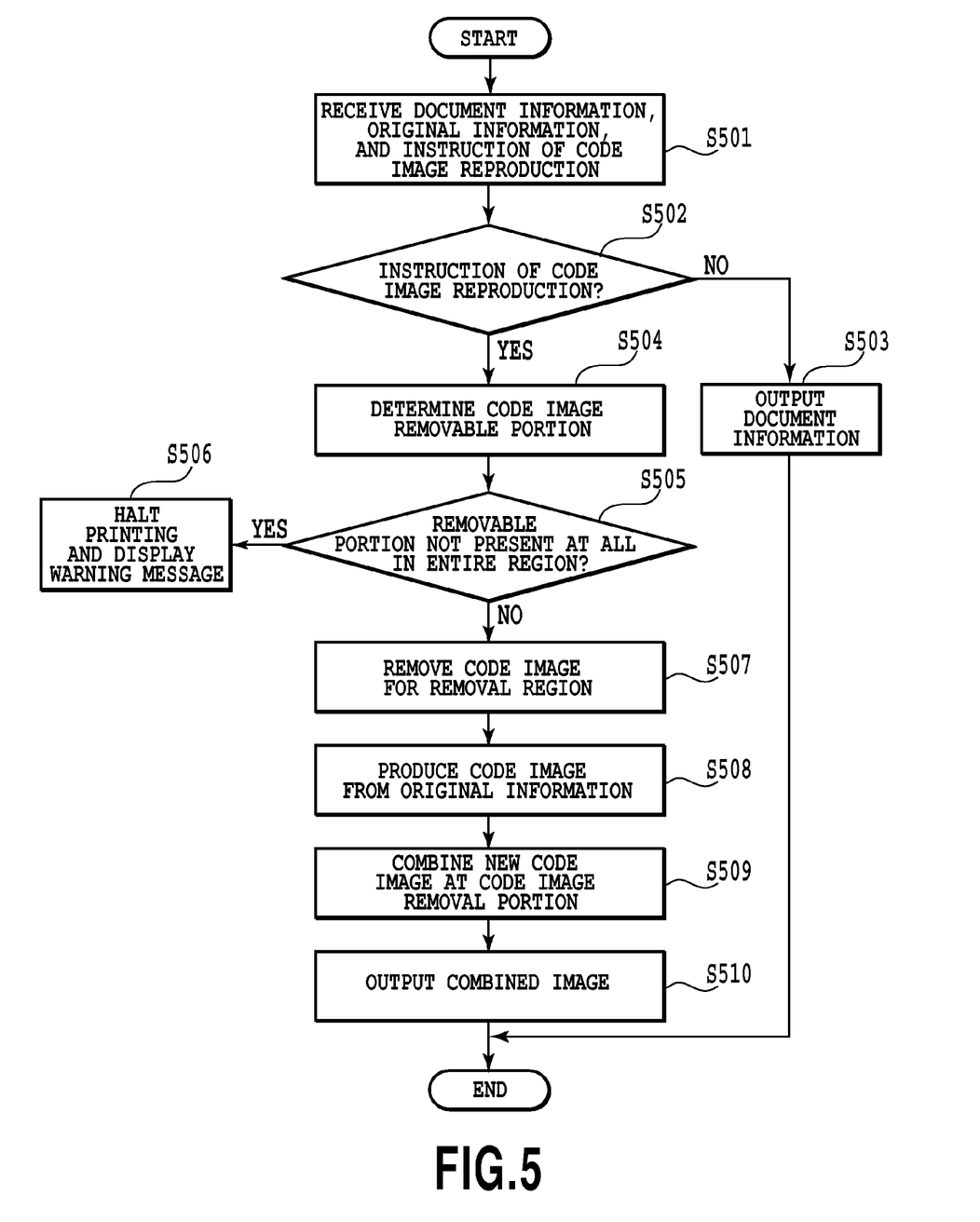
FIG. 5 is a flowchart showing processing when an image forming device combines a code image with a document image for printing according to the first embodiment of the present invention.

Subsequently, the processing carried out when the MFP 1001 receives the read image, the original information, and the instruction of code image reproduction from the MFP 1100 will be described using FIG. 5.

At step S501, the MFP 1001 receives the read image, the original information, and the instruction of code image reproduction from the MFP 1100.

At step S502, it is determined whether or not the instruction of code image reproduction in S311 has been transmitted. When the instruction of code image reproduction has not been transmitted, the process proceeds to step S503. In S503, the document image is output without replacement of code images etc., as will be described later, and this processing is ended.

As described above, when the instruction of code image reproduction has not been transmitted at step S502, the degree of damage of the code image is very slight. At a result, the process proceeds to step S503 and the read image is output without replacement of code images.

When the instruction of code image reproduction has been transmitted at step S502, the degree of damage of the code image is significant, and therefore, a code image is reproduced by carrying out processing at step S504 and subsequent steps.

At step S504, a code image removable portion is determined from the read image.

Figure 6:
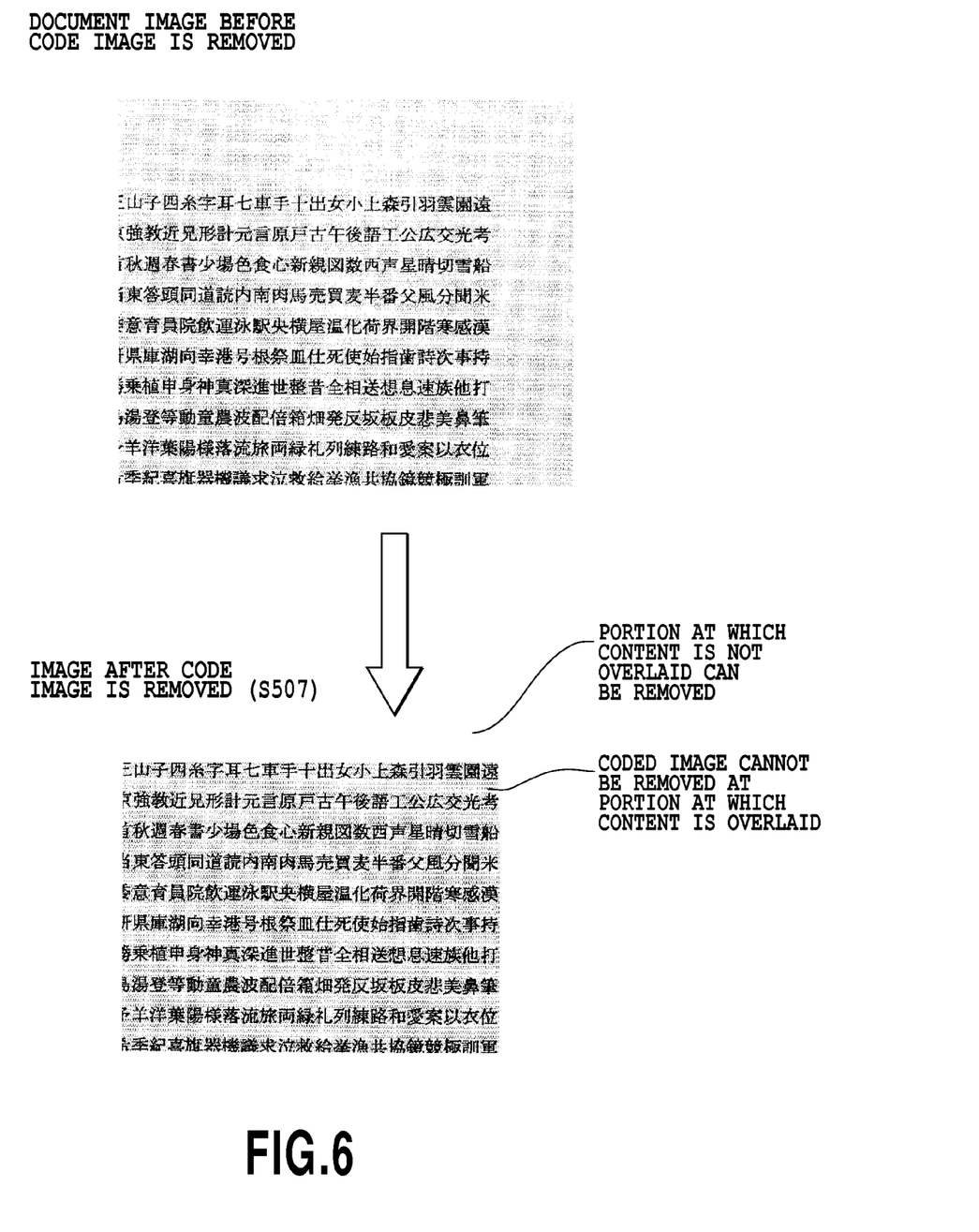
FIG. 6 is a diagram showing an image of removal processing of two-dimensional barcode according to the first embodiment of the present invention.

Here, a code image removable portion will be described using FIG. 6. It is assumed that a code image is combined in the entire region of the read image before the removal of the code image. Then, it is also assumed that part of the code image is overlaid with the content, such as letters, photos, and graphics, of the document image.

The portion at which the code image is overlaid with the document image cannot be removed. On the other hand, the portion at which it is not overlaid with the document image can be removed, and therefore, this portion is referred to as a removable portion. In the present embodiment, the code image is removed from the removal portion, as will be described later, and therefore, the removal portion corresponds to the region in which the code image is removed in a one-to-one manner.

At step S505, when a removable portion is not present at all in the entire region of the read image, or when a very small removable portion exists, if any, then, the process proceeds to step S506. On the other hand, when a removable region is present in the read image, the process proceeds to step S507. Here, the wording "a very small removable portion exists, if any" means that the removable portion is very small to the degree that even if the code image is combined only in the removable portion at step S509, the original information cannot be extracted from the code image.

At step S506, the output is terminated and a warning message is displayed to warn a user. The reason for this action is that despite the existence of a state where the degree of damage of the code image is significant because of the presence of the instruction of code image reproduction at step S502, the code image cannot be removed or the code image cannot be reproduced. At a result, the read image having a damaged code image is prevented from being output by terminating the output.

At step S507, the MFP 1001 removes the code image at the removable portion determined at step S504 (carries out the removal of the code image) and enters step S508.

At a result, the portion at which there is no overlay of the content is removed. This is shown by an image on the lower side of FIG. 6.

At step S508, the code image is reproduced from the original information (a new code image is created) and the process proceeds to step S509. This reproduction is carried out by adding an error correcting code to the original information to obtain code-added information and then constructing a code image from the code-added information. That is, the code image is constructed from the original information. In the present embodiment, the construction of the code image is carried out in accordance with the shape and size of the removable portion.

Figure 7:
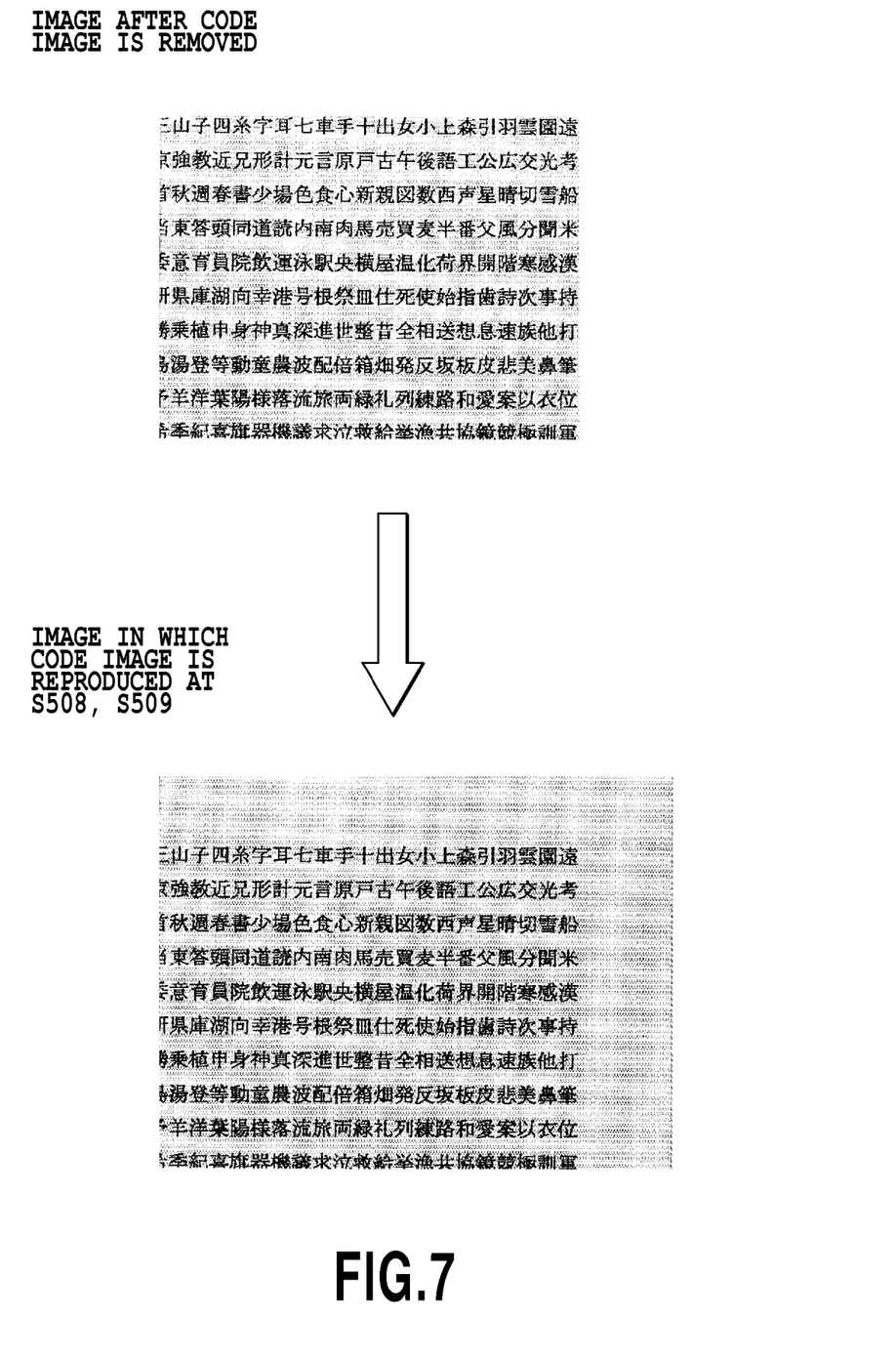
FIG. 7 is a diagram showing an image of reproduction processing of two-dimensional barcode according to the first embodiment of the present invention.

At step S509, the new code image reproduced at step S508 is combined on the removable portion in the read image, the removable portion being determined at step S504 and from which the code image is removed at step S507, and then the process proceeds to step S510. This is shown in FIG. 7.

That is, the code image is removed at step S507 and further, at step S509, the new code image is combined, and thereby, the original code image is replaced with the reproduced code image.

At step S510, the combined image at step S509 (that is, the read image the code image of which is replaced with another) is output and the processing is ended.

As described above, in the present embodiment, in accordance with the error detecting rate obtained when the original information is extracted from the code image in the printed image read by the scanner 2015, the two-dimensional barcode (code image) is removed and reproduced, and thus, the error detecting rate is improved as a result.

In the present embodiment, an instruction to read a code image is input via the operation unit 2006 by a user and then the MFP 1100 operates in the two-dimensional barcode read mode. However, the present invention is not limited to the above arrangement. For example, the two-dimensional barcode read mode may not be provided. That is, the processing described using FIG. 3 and FIG. 5 may be carried out in the normal scan mode or copy mode.

That is, what is important in the present invention is to determine whether or not the error detecting rate is greater than the threshold in the image forming device and when greater, the code image removable portion is removed and the code image is reproduced in the image forming device.

When the error correcting rate reaches the predetermined limit, the original information cannot be extracted from the code image any more, and therefore, the state where the original image cannot be extracted can be prevented by reproducing the code image before the error detecting rate reaches the predetermined limit With this arrangement, the device that forms an image may be electrically connected with the image processing device or may be integrated with the image processing device. That is, the present embodiment is described on the assumption that the MFP 1001 is different from the MFP 1100. However, it may happen that the device that has created printed matter including a code image is the same as the device that has scanned the printed matter. That is, there may be a case where the MFP 1001 and the MFP 1100 are assembled in a single device. In such a case, the device that forms an image and the image processing device are integrally formed into one unit and it is obvious that the device that forms an image and the image processing device are electrically connected to each other.

Second Embodiment

Figure 8:
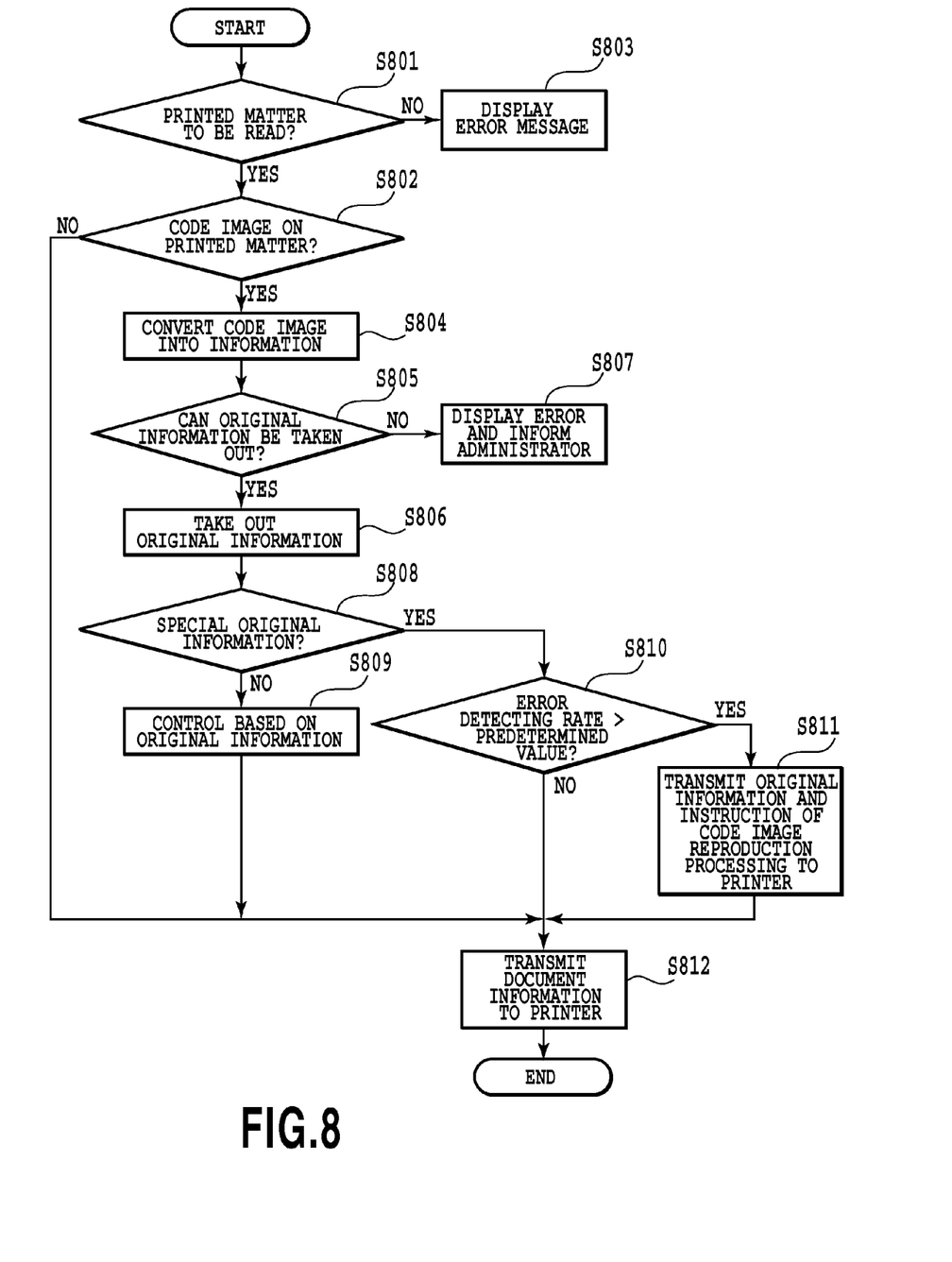
FIG. 8 is a flowchart showing processing relating to information obtained by error correction coding of an information source in a multifunction system according to a second embodiment of the present invention.

The processing according to a second embodiment when the MFP 1100 scans a printed matter will be described using FIG. 8.

It is assumed that a user has selected a code image read mode by means of the operation unit 2006 installed in the MFP 1100 prior to the scanning of the printed matter.

At step S801, the MFP 1100 determines whether or not there is printed matter to be read on the document table of the scanner. This determination can be made based on a detection signal detected by a sensor provided on the document table of the scanner. When it is determined that there is a printed matter on the document table, the MFP 1100 scans (reads optically) the printed matter on the document table to produce a read image and then enters step S802. On the other hand, when it is determined that there is no printed matter on the document table, the MFP 1100 enters step S803 and displays an error message on a display screen.

At step S802, the MFP 1100 determines whether or not there exists a code image in the read image. When it is determined that there is a code image, the MFP 1100 enters step S804. On the other hand, when it is determined that there is no code image, the MFP 1100 enters step S812.

At step S804, the MFP 1100 obtains information by computerizing the code image.

At step S805, the MFP 1100 determines whether or not the original information can be retrieved from the information obtained at step S804 using the error correcting code included in the information obtained at step S804. At this time, the error detecting rate of the original information is also calculated.

It is assumed that in each image forming device described in the present embodiment, the code image is created with an error correcting rate of 7%.

At step S805, when it is determined that the original information can be retrieved, the MFP 1100 enters step S806 and then enters step S808 after retrieving the original information from the information obtained at step S804. On the other hand, when it is determined that the original information cannot be retrieved at step S805, the MFP 1100 enters step S807 and informs an administrator as well as displaying a read error on the display screen. In the present embodiment, informing an administrator means transmitting mail indicative of an original-information-retrieval-preventing state to a mail address registered as an address used by an administrator who administers the image forming device having received the error detecting rate.

At step S808, the MFP 1100 determines whether or not the original information obtained in S806 is the special original information. That is, it is determined whether or not the extracted original information includes the ID of the image forming device (MFP or printer) that prints out the code image, the user ID, the date of output (date of print), the security level, information for preventing tampering, etc. When the result of the determination is negative, that is, such information is not included, the MFP 1100 enters step S809 and controls the controller unit 2000 based on the original information. On the other hand, when such information is included, the MFP 1100 enters step S810.

At step S810, the MFP 1100 determines whether the error detecting rate calculated at step S805 is less than a predetermined value or not less than the predetermined value and when less than the predetermined value, the MFP 1100 enters step S812.

On the other hand, when the error detecting rate is not less than the predetermined value, the MFP 1100 enters step S811. The predetermined value is assumed to be 5% in the present embodiment. The method for deciding the predetermined value may be the same as in the case of the first embodiment.

As described above, the reason that the MFP 1100 enters step S812 when the error detecting rate is less than the predetermined value at step S810 is that the degree of damage to the code image is very slight and it is not necessary to perform correction or the like of the code image. In addition, if the processing in S811 is carried out when it is not necessary to perform correction or the like of the code image, as described above, the time required for the processing is wasted, and therefore, in the present embodiment, the process proceeds to step S812. If the processing at step S811 is carried out, two code images exist on a sheet as a result. If so, it becomes necessary to select one of the code images at the time of subsequent information extraction and excessive time is required for information extraction. To avoid the situation above, the process proceeds to step S812 in the present embodiment when it is not necessary to perform correction or the like of the code image, as described above.

The reason that the MFP 1100 enters step S811 when the error detecting rate is not less than the predetermined value at step S810 is that the degree of damage of the code image is significant, and therefore, there may be a case where the original information cannot be retrieved when the code image after being printed is read again. At step S811, the MFP 1100 transmits the original information obtained in S806 and the instruction of code image reproduction processing to the image forming device (MFP 1001).

At step S812, the MFP 1100 transmits the read image to the image forming device (MFP 1001) indicated in the ID of the image forming device in the special original information.

Figure 9:
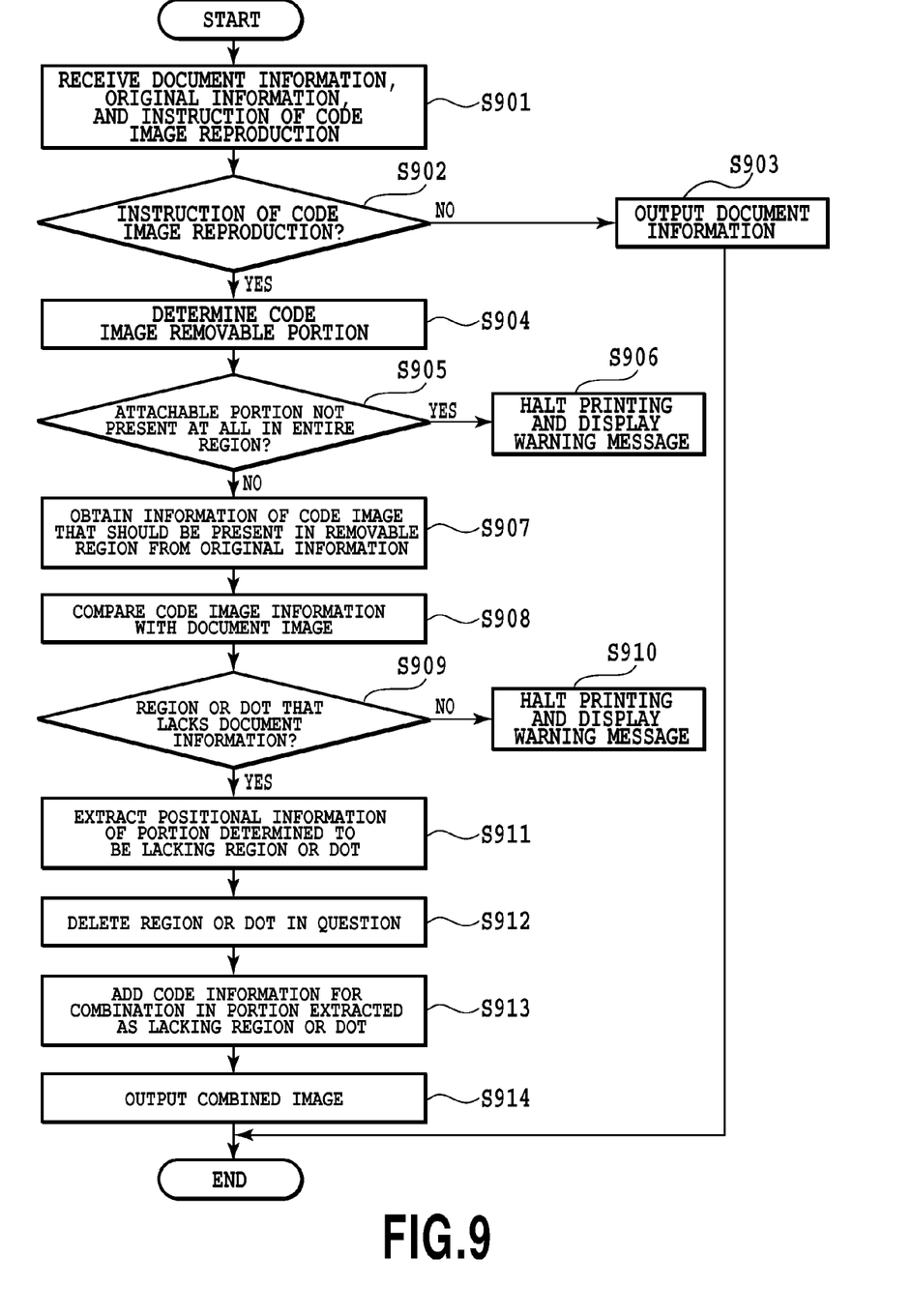
FIG. 9 is a flowchart showing processing when an image forming device combines a code image with a document image for printing according to the second embodiment of the present invention.

Subsequently, the processing carried out when the MFP 1001 receives the read image, the original information, and the instruction of code image reproduction from the MFP 1100 will be described using FIG. 9. Here, the MFP 1001 and the MFP 1100 may be accommodated in the same housing or may be accommodated in different housings and connected to each other by LAN.

At step S901, the MFP 1001 receives the read image, the original information, and the instruction of code image reproduction from the MFP 1100.

At step S902, it is determined whether the instruction of code image reproduction at step S811 has been transmitted. When the instruction of code image reproduction has not been transmitted, the process proceeds to step S903. In S903, the document information is output as is without correction processing of the code image etc., as will be described later, and this processing is ended.

As described above, when the instruction of code image reproduction has not been transmitted at step S902, the degree of damage of the code image is very slight. At a result, the process proceeds to step S903 and the read image is output without replacement of code images.

When the instruction of code image reproduction has been transmitted at step S902, the degree of damage of the code image is significant, and therefore, a code image is reproduced by carrying out processing at step S904 and subsequent steps.

At step S904, a code image removable portion is determined from the read image.

At step S905, when a removable portion is not present at all in the entire region of the read image, or when a very small removable portion exists, if any, then, step S906 is entered. On the other hand, when a removable region is present in the read image, the process proceeds to step S907. Here, the wording "a very small removable portion exists, if any" means that the removable portion is very small to the degree that even if the code image is combined only in the removable portion at step 913, the original information cannot be extracted from the code image.

At step S906, the output is terminated and a warning message is displayed to warn a user. The reason for this action is that despite the existence of a state where the degree of damage of the code image is significant because of the presence of the instruction of code image reproduction at step S902, the code image cannot be removed or the code image cannot be reproduced. At a result, the read image having a damaged code image is prevented from being output by terminating the output.

At step S907, the code information image is obtained by determining necessary code information from the original information. At step S908, the code information image in the removable region and the code information from the original information are compared. At step S909, based on the comparison result in S908, it is determined whether there exists a region or dot of the code information image that lacks the code information. When there exists no lacking region or dot, this contradicts the instruction of code image reproduction, and therefore, a warning message is displayed. When there exists a region or dot of the code information image that lacks code information, the process proceeds to step S911.

At step S911, the positional information of the portion of the code information image that lacks the code information is recognized and the lacking portion is extracted.

At step S912, the portion extracted at step S911 is removed.

At step S913, the code information that the portion extracted at step S911 lacks is added to the code information image to produce a combined image.

At step S914, the combined image at step S913 (that is, an image to which the lacking portion of the code image is added) is output and the processing is ended.

As described above, in the present embodiment, it is determined whether or not the error detecting rate is greater than the threshold in the image processing device. When greater, the missing region or dot in the code image removable portion is detected in the image forming device and the portion is removed or eliminated once and then the missing portion is reproduced.

As for the deletion of a dot carried out at step S912 in this case, it is deleted once to prevent stains from remaining in the periphery of the dot to be newly added due to the shift of the dot to a certain extent and other factors. However, the execution of this step can be omitted in accordance with the conditions of the engine performance or the presence of background color.

The object of the present invention is to prevent the state where original information cannot be extracted by reproducing the code image before the error detecting rate reaches the read limit because when the error detecting rate reaches the read limit, the original information cannot be extracted from the code image anymore. In the present specification, in S310 or S810, it is determined whether the code image is reproduced depending on whether the error detecting rate reaches or exceeds a fixed value. However, in a case where the missing of original information is not allowed, such as when it includes information about the printing performance of the printer, the read performance of the scanner, or security, the reproduction processing of the document image can be carried out regardless of the determination result.

Other Embodiments

A processing method, in which programs that cause the configurations in the above-described embodiments to operate in order to realize the functions in the above-described embodiment are stored in computer-readable storage media and the programs stored in the storage media are read as codes for the execution in the computer, is also included in the scope of the above-described embodiments. In addition to the storage media in which the above-described programs are stored, the programs themselves are obviously included in the above-described embodiments.

As such storage media, for example, a floppy (registered trademark) disc, a hard disc, an optical disc, a magneto-optical disc, a CD-ROM, magnetic tape, a nonvolatile memory card, and ROM can be used.

Not limited to the case of the execution of the programs alone stored in the above-described storage media, the case where the programs run on the OS and the operations in the above-described embodiments are executed in cooperation with other software and the functions of extension boards is also included in the scope of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-198948, filed Jul. 31, 2007 and 2007-331884, filed Dec. 25, 2007, which are hereby incorporated by reference herein in their entirety.

The invention claimed is:

1. An image processing device comprising:
    an extraction unit configured to extract original information from a code image in a read image obtained by reading a sheet on which the code image is formed;
    a determination unit configured to determine whether an error detecting rate detected in a case where the extraction unit extracts the original information is not smaller than a predetermined value;
    a generation unit configured to generate a code image using the original information extracted by the extraction unit in a case where the determination unit determines that the error detecting rate is not smaller than the predetermined value; and
    a replacement unit configured to replace the code image in the read image with the generated code image.

2. The image processing device as in claim 1, wherein the replacement unit includes:
    a removal unit configured to remove the code image from the read image in a case where determination unit determines that the error detecting rate is not smaller than the predetermined value; and
    a combination unit configured to combine the generated code image with the read image in a region of the read image from which the removal unit removed the code image.

3. The image processing device as in claim 1, further comprising:
    an output unit configured to output the read image obtained by the replacing in a case where the determination unit determines that the error detecting rate is not smaller than the predetermined value, and output the read image without performing the generating and the replacing in a case where the determination unit determines that the error correcting rate is smaller than the predetermined value.

4. An image processing method comprising the steps of:

extracting original information from a code image in a read image obtained by reading a sheet on which the code image is formed;

determining whether an error detecting rate detected in a case where the original information is extracted at the extracting step is not smaller than a predetermined value;

generating a code image using the original information extracted at the extracting step in a case where it is determined that the error detecting rate is not smaller than the predetermined value in the determining step; and replacing the code image in the read image with the generated code image.

5. The image processing method as in claim 4, wherein the replacing step includes the steps of:

removing the code image from the read image in a case where it is determined that the error detecting rate is not smaller than the predetermined value in the determining step;

combining the generated code image with the read image in a region of the read image from which the code image was removed in the removing step.

6. The image processing method as in claim 5, further comprising the step of outputting the read image obtained by the replacing step in a case where it is determined that the error detecting rate is not smaller than the predetermined value in the determining step, and of outputting the read image without performing the generating and the replacing in a case where that the error correcting rate is smaller than the predetermined value in the determining step.

7. A non-transitory computer-readable medium storing a program for causing a computer to perform the steps in the image processing method as in claim 4.

* * * * *